US010498747B1

(12) United States Patent
Meaney et al.

(10) Patent No.: US 10,498,747 B1
(45) Date of Patent: Dec. 3, 2019

(54) USING PROGRAM CODE WITH A MONITORING SERVICE

(71) Applicant: Amazon Technologies, Inc., Seattle, WA (US)

(72) Inventors: Michael Patrick Meaney, Dublin (IE); Tamas Polyak, Dublin (IE)

(73) Assignee: Amazon Technologies, Inc., Seattle, WA (US)

(*) Notice: Subject to any disclaimer, the term of this patent is extended or adjusted under 35 U.S.C. 154(b) by 221 days.

(21) Appl. No.: 15/191,381

(22) Filed: Jun. 23, 2016

(51) Int. Cl.
*H04L 29/06* (2006.01)
*G06F 9/54* (2006.01)

(52) U.S. Cl.
CPC .......... *H04L 63/1416* (2013.01); *G06F 9/547* (2013.01); *H04L 63/20* (2013.01)

(58) Field of Classification Search
CPC ...... H04L 63/1416; H04L 63/20; G06F 9/547
See application file for complete search history.

(56) References Cited

U.S. PATENT DOCUMENTS

| | | | | |
|---|---|---|---|---|
| 6,199,095 B1* | 3/2001 | Robinson | ............... | G06F 9/4488 718/107 |
| 7,340,747 B1* | 3/2008 | Zeliger | .................. | G06F 9/465 709/203 |
| 8,510,773 B1* | 8/2013 | Abou-Rizk | ........ | G06Q 30/0261 725/32 |
| 8,826,443 B1* | 9/2014 | Raman | ................. | G06F 11/004 726/26 |
| 9,507,540 B1* | 11/2016 | Adogla | ............... | G06F 9/45558 |
| 2007/0288514 A1* | 12/2007 | Reitter | .................. | G06F 16/951 |
| 2008/0221987 A1* | 9/2008 | Sundaresan | ............ | G06Q 30/02 705/14.54 |
| 2009/0012991 A1* | 1/2009 | Johnson | .................. | G06Q 30/02 |
| 2009/0077371 A1* | 3/2009 | Powell | ..................... | H04L 9/083 713/152 |
| 2012/0272208 A1* | 10/2012 | Pryhuber | ............ | G06F 9/44505 717/104 |
| 2013/0204886 A1* | 8/2013 | Faith | .................. | G06Q 30/0631 707/756 |
| 2013/0218657 A1* | 8/2013 | Salmon | .................. | G06Q 10/00 705/14.29 |
| 2013/0239198 A1* | 9/2013 | Niemi | ................. | H04L 63/0272 726/12 |
| 2014/0040257 A1* | 2/2014 | Chandrasekaran | ........................ | G06F 17/30893 707/736 |

(Continued)

*Primary Examiner* — Ghodrat Jamshidi
(74) *Attorney, Agent, or Firm* — Thorpe North & Western, LLP

(57) ABSTRACT

A technology is provided for using a program code with a monitoring service in computing service environment. An application programming interface (API) call is prepared at a monitoring service according to one or more API call parameters, using a security data template, to be sent to the program code. The API call having the security data template can be sent from the monitoring service having a dashboard to the program code to query a target resource. A response can be received from the program code as return information from the program code and the target resource using the security data template according to the API call. The response can be displayed as a templated data response in the dashboard of the monitoring service according to a defined template.

20 Claims, 13 Drawing Sheets

(56) References Cited

U.S. PATENT DOCUMENTS

| | | | |
|---|---|---|---|
| 2014/0114706 A1* | 4/2014 | Blakely | G06Q 10/02 |
| | | | 705/5 |
| 2014/0282443 A1* | 9/2014 | Hoban | G06F 8/437 |
| | | | 717/143 |
| 2017/0091772 A1* | 3/2017 | Piel | G06Q 20/12 |

* cited by examiner

Add widget to dashboard    500    x

Select Widget Type:

○ Metric Graph
    Widget that contains a selection of the Monitoring service metrics in a line graph ○ Text Widget
    Freeform text for customer dashboard ● Rendering HTML Widget
    Embed HTML returned from any program code function Cancel    Configure

FIG. 5A alarmDoughnut    x  ▲

_dummyLogGenerator alarmDoughnut alarmStatus avg awsToHTML awsToTable blendOneSecondMetrics

Call Program Code Configuration

Call Compute Service Code Configuration Preview

| Save | Save and Test | Actions ▼ |

| Code | Configuration | Event Sources | API Endpoints | Monitoring |

570

This is just a template
Title: Call Program Code alarmDoughnut
Function: alarmDoughnut
Parameters:
ReBOOT

Call Program Code Configuration

Call Program Code Configuration Computing Instances Utilization

580

Call Compute Service Code Configuration

Call Compute Service Code Configuration Preview

USING PROGRAM CODE WITH A MONITORING SERVICE

BACKGROUND

Computing systems may be found in the workplace, at home, or at school. Computing systems may include computing and data storage systems to process and store data. Some computing systems have begun offering centralized, virtual computing options known as service provider environments that may reduce overall costs, improve availability, improve scalability, and reduce time to deploy new applications. For example, some computing systems may act as a service that provide virtual computing, virtual storage, virtual networking and other virtual services as purchased for variable periods or on a pay-per-use basis (e.g., pay for a certain amount of API (application program interface) transactions or bandwidth) from large pools of re-purposable, multi-tenant computing resources or services.

Such service provider environments may use dashboard style graphical visualization tools to enable customers to analyze and monitor performance metrics of a customer's computing resources within the service provider environment. The system administrators may use dashboards to view a number of trend graphs that may represent system performance metrics. By viewing a dashboard, a system administrator may quickly identify anomalies in certain performance metrics that may indicate a potential problem with a customer's computing resources or software services provided by the service provider environment. Graphical visualization and metrics monitoring tools provided by the service provider may have functionality determined and maintained by the service provider. While the desired monitoring functionality may be selected from monitoring options provided by a service provider to a customer, the monitoring resources may not be modifiable by a customer in order to maintain the overall security of the service provider environment.

BRIEF DESCRIPTION OF THE DRAWINGS

FIGS. 5A-5F illustrate examples of dashboard widgets using a program code with a monitoring service in a service provider environment according to an example of the present technology.

DETAILED DESCRIPTION

Figure 1:
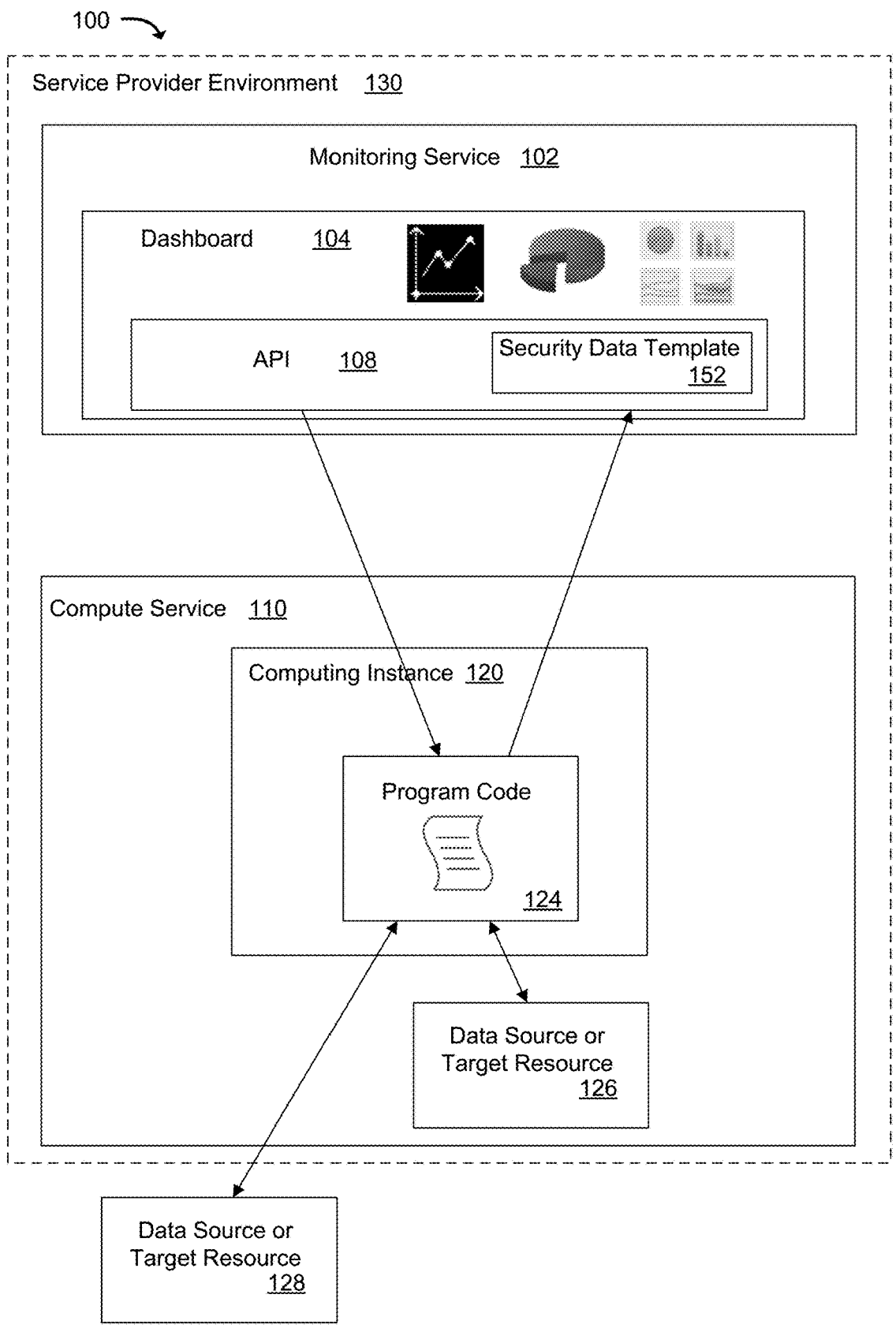
FIG. 1 illustrates a system using program code with a monitoring service in a service provider environment according to an example of the present technology.

The present technology uses a program code with a monitoring service in a service provider environment or computing service environment to provide a wide variety of functionality to a monitoring service while maintaining the security of the monitoring service. An application programming interface (API) call may be prepared at a monitoring service according to one or more defined API call parameters to be sent to the program code. The API call or API definitions may have a security data template to enable the protection of the service provider environment from malicious attacks. In addition the API call may be configured to call program codes which are stand-alone code or functions that may be executed in service provider environment. The API call having the security data template may be sent from the monitoring service with a dashboard to the program code, and the program code may further optionally query a target resource (e.g., a data store, super computing cluster, object storage, a service, a social media network) for additional data used by the program code during processing. A response may be received from the program code which is return information from the program code and the optional target resource using the security data template according to the API call. The response received by the monitoring service may be displayed as a templated data response in the dashboard of the monitoring service according to a defined template. In one aspect, a dashboard can include a dashboard graph.

In one aspect, the present technology enables the defining of a call function using a program code according to one or more parameters for querying a target resource for a monitoring service. The call function may be sent, using the program code to query the target resource. A response can be retrieved from the one or more target resources, such as data store, the supercomputing cluster, an object storage, a social media network, and/or another service, according to the call function. The response may be returned to the dashboard using the security data template and may be displayed as a templated data response, such as a web page, in the dashboard according to the call function. For example, a program code may be used to collect specific aggregated data and return specific aggregated data to the dashboard.

In an additional aspect, the present technology provides for using the results from a program code in a monitoring service in computing service environment. An application programming interface (API) call may be defined for calling a program code according to one or more API call parameters and the API call parameters may also be sent to a target resource such a social media source. The API call can be sent, using the program code, from one or more widgets of a dashboard via a security data template. In one aspect, a widget may be a generic software application that may comprise portable code intended for one or more different software platforms, an applet intended to be used within one or more web browsers, and/or a reusable element used in a graphical user interface. That is, a widget may be a configurable element that may be displayed on a dashboard, GUI, or display. The target resource can be queried for data to include in a templated data response according to the API call. The templated data response may be received from the target resource via the security data template. The templated data response can be displayed in the dashboard. For example, a dashboard widget of the dashboard may display a templated data response as at least one of 1) a web page in the rendering widget, 2) metrics within the monitoring service identified by the graph widget using resource tags obtained via the program code, and 3) labeled data that may be graphed. In one aspect, a "widget" may refer to a graphical display element or control that may be an element of viewing or interaction in a graphical user interface (GUI) of a dashboard. Also, a widget may facilitate a specific type of customer-computer interaction and may appear as a visible part of a GUI. A widget may also display an information arrangement that may be changeable according to a desired preference.

In existing monitoring services that are publicly available to customers, the monitoring service is limited to providing pre-programmed reporting functionality, widgets and monitoring features to customers. Since many customers share the use of the monitoring services, the monitoring service may be protected from changes by customers through stopping customers from providing any custom code, custom input data, other custom reports to the monitoring services. This may protect the monitoring service from code injection attacks, malicious executable code or other attacks. However, such monitoring services are then limited to that functionality provided by a service provider. In the present technology, a program code, rendering code (e.g., HTML), a list of metrics, or labeled data may be used with a monitoring service in a service provider environment or computing service environment using a security data template with an API to provide extended functionality to a protected monitoring service while maintaining the security of the monitoring service.

FIG. 1 illustrates a system 100 for using a program code with a monitoring service in a service provider environment according to an example of the present technology. The system 100 may include a service provider environment 130 that includes a monitoring service 102 and a compute service 110.

In one aspect, the service provider environment 130 may provide virtualized computing services (i.e., virtualized computing, virtualized storage, virtualized networking, etc.) to the compute service 110 and the monitoring service 102. More specifically, the service provider environment 130 may provide virtualized computing, virtualized storage, virtualized networking and other virtualized services that are executing on a hardware substrate. Also, the service provider environment 130 may provide data communication between the compute service 110 and the monitoring service 102 by way of the network (not shown) that may include a virtual network that is within the service provider environment 130 or other suitable networks, etc.

It should be noted that in one aspect, the monitoring service 102 may be included within the service provider environment 130 and/or remotely located from the service provider environment 130. Also, the compute service 110 may be included within the service provider environment 130 and/or remotely located from the service provider environment 130. For example, the monitoring service 102 or the compute service 110 may be on a private computing environment. The service provider environment 130 is illustrated with a dotted line because the services may operate within a service provider environment or the services may operate as independent services outside of a service provider environment.

In one aspect, the monitoring service 102 can include a dashboard 104 along with other services that collect metrics about a customer resources within the service provider environment. For example, metrics or metric data may be performance metrics associated with a service provider environment or information management system, for example, CPU metrics, website hit metrics, page view metrics, network traffic metrics, session metrics, and other types of performance metrics. Other examples of metric data types recorded by a monitoring service 102 may be server performance metric data, information management metric data, purchasing metric data, or another metric data type. To illustrate more specifically, server performance metric types may include requests per second, error rates, average response time, CPU utilization, etc. Information management system metric types may include time, costs, resources, quality, etc. The dashboard 104 can include one or more application programming interfaces (API) 108, which may include a security data template 152 as part of or embedded into the API calls.

The compute service 110 may include a computing instance 120 and/or a data source or target resource 126. The compute instance 120 may include a program code 124 that is capable of executing on the computing instance. The program code is a segment of program code that may be like a function, and the program code may receive parameters, perform processing and provide return values. The program code may also be called a "compute service code" or "compute service program code." In one aspect, the program code may execute on a managed compute service code platform for back-end web services that runs a defined program code on the computing instance 120. That is, the program code may execute in a compute service that runs code in response to requests to execute the program code, and automatically manages the compute resources used by that program code. Once a program code has been executed and the appropriate results have been returned, the program code and results may be flushed from memory of the computing instance 120 or container in which the program code was executing. The program code provides for building smaller, on-demand applications that may be responsive to requests, events and new information. For example, the program code may be used to automatically provision back-end services triggered by custom program code requests. In one aspect, the program code may be triggered in response to a request or an event, may execute or perform a function in response to the request or event, and may return a response or value. In an additional aspect, an additional data source or target resource 128 may be located outside of the service provider environment 130. For example, the additional data source 128 may be in a private data center or at another remote location accessible via the internet.

In operation, by way of example only, one or more API calls 108 may be defined including one or more API call parameters to be sent to the program code 124 and then optionally on to one or more target resources, such as data source or target resources 126, 128 associated with a monitoring service 102. The API call 108 can be sent from the dashboard 104 using a security data template 152 to the program code 124. The target resource(s), such as data source or target resources 126, 128, may be queried by the program code 124 for data that may be used for a templated data response according to the API call 108. A data response can be received from the target resource, such as data source or target resources 126, 128, via the security data template 152. The program code 124 may perform any functions that are coded into source code of the program code 124 including calling the functionality of the resource objects or services within the service provider environment 130. For example, the program code 124 may include calls to computing instances, managed services, cluster databases, data store services, NoSQL data stores, distributed applications, custom applications, etc.

The data response received from the target resource 126 may be used to form a data response to the API call 108. The program code 124 may perform any computing functions which the program code 124 has been programmed to perform and then submit the results in the form defined by a data security template 152 as embedded into the API calls 108.

Figure 2:
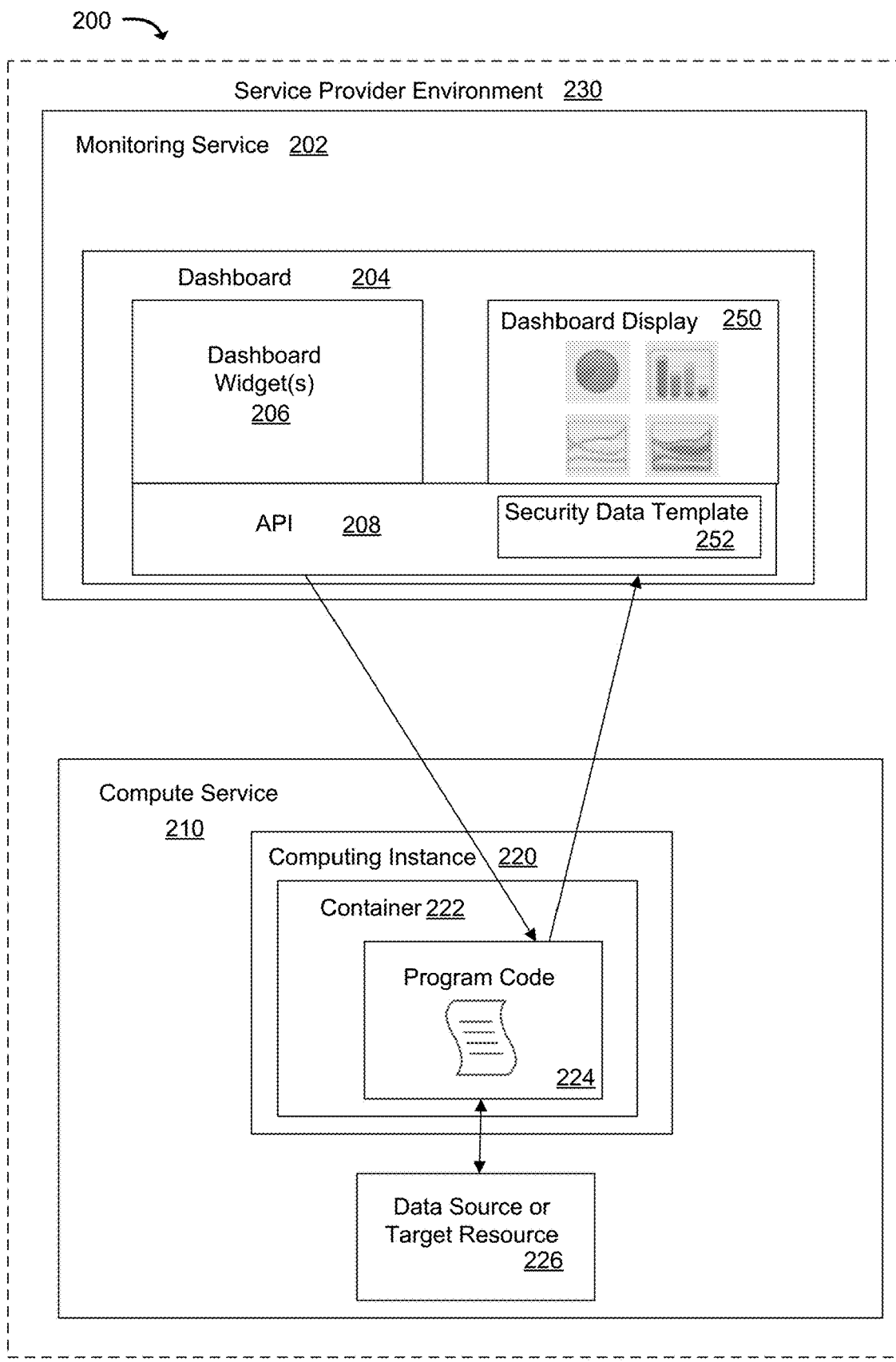
FIG. 2 illustrates an additional system for using program code with a monitoring service in a service provider environment according to an example of the present technology.

FIG. 2 illustrates the system 200 for using a program code 224 with a monitoring service 202 in a service provider environment 230. In one aspect, each of the components, modules, and/or services described in FIG. 1 may also apply to the components, modules, and services of FIG. 2. Also, one or more of the operations and steps of FIG. 1 may also be included in one or more operations or actions of FIG. 2.

Similar to FIG. 1, the system 200 may include a monitoring service 202 and the compute service 210. The monitoring service 202 can include a dashboard 204. As more clearly depicted in FIG. 2, the dashboard 204 may also include a dashboard widget 206 and a dashboard display 250. The dashboard 204 and the dashboard widget 206 can be in association with and/or in communication with the API 208 within the dashboard 204. Furthermore, the computing instance 220 of FIG. 2 also depicts a container 222 (e.g., container virtualization with isolated user space instances) that comprises the program code 224. A new container 222 may be created to execute a program code 224 and then container may be shut down. Alternatively, the container may be reused but only used for one program code 224 at a time.

In operation, one or more API calls can be defined and/or prepared at the monitoring service 202 according to one or more API call parameters, having a security data template 252, to be sent to the program code 224 within the container 222. One or more API calls, using the security data template 252, can be sent from the one or more dashboard widgets 206 of the dashboard 204 in the monitoring service 202 to the program code 224 (e.g., a compute service program code that can be customized and/or defined to perform a function) to query the data source or target resource 226. A response from the program code 224 may be received as return information from the program code 224, which may in turn use the data source or target resource 226 to generate a response that may be sent back to the monitoring service using the security data template 252 according to the API 208. The response may be displayed as a templated data response in the dashboard display 250 of the dashboard 204 of the monitoring service 202 according to a defined template. In one aspect, dashboard widgets 206 may be objects that are selectable by a user. Each dashboard widget 250 may have a dashboard display object 250. The dashboard 204 can be a portion of the monitoring service that generates a visual output for the monitoring service 202. In this case, for example, the dashboard 204 can also monitor the calling of the program code 224 and the data passed through the API using the security data template 252.

This technology provides the ability for a monitoring service 202 to be able to call a program code 224 and perform a wide variety of computing functions that may be coded into the program code 224. Further, the program code may obtain data from or access any service or computing function available in the service provider environment or the internet. This increases the functionality available to the monitoring service 202 and expands the functionality beyond a limited set of functionality provided by the monitoring service 202.

Figure 3:
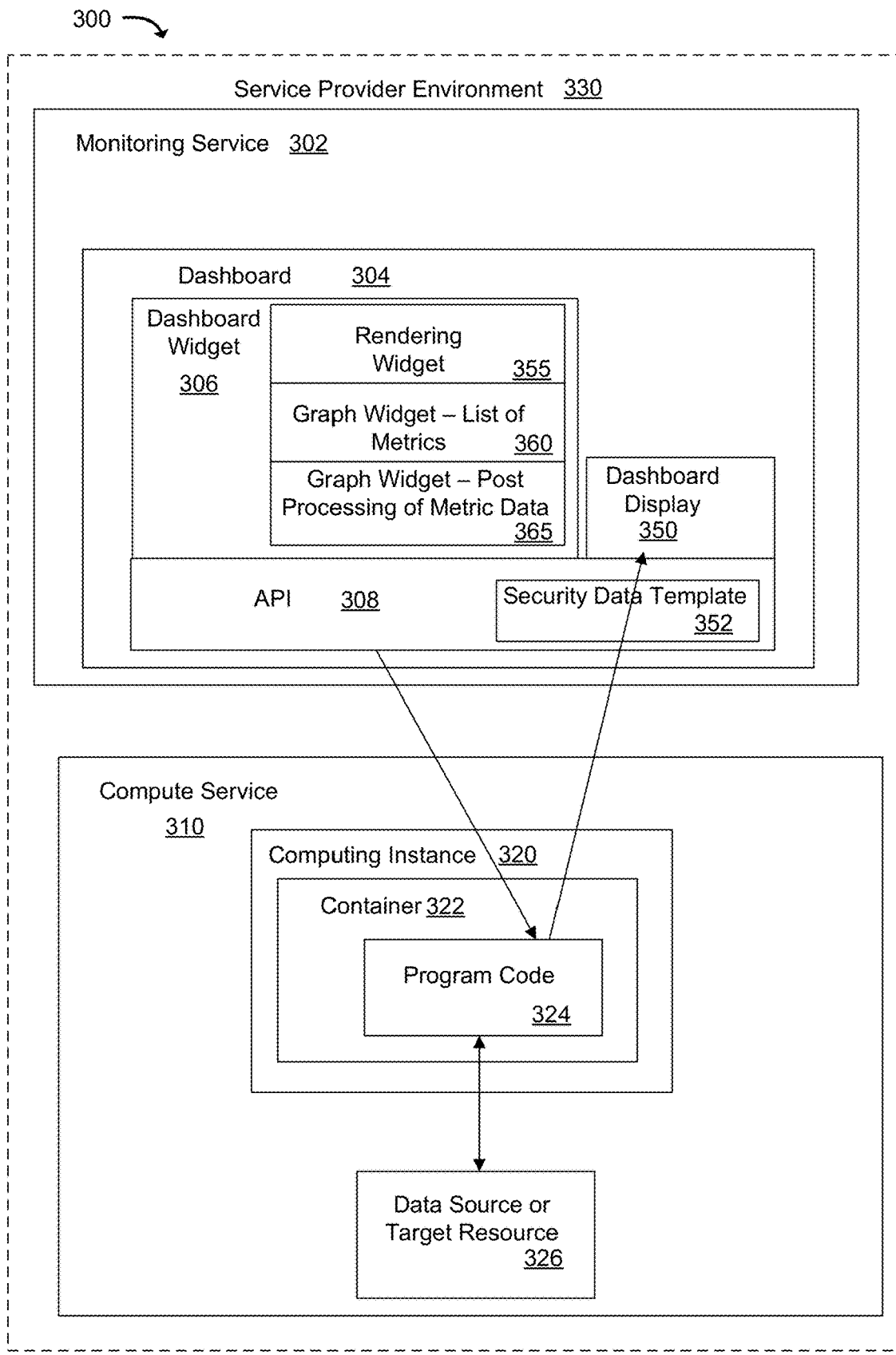
FIG. 3 illustrates a system for dashboard widgets using program code with a monitoring service in a service provider environment according to an example of the present technology.

Turning now to FIG. 3, a system 300 is depicted for using a program code 324 with a monitoring service 304 for accessing services in a service provider environment 302. In one aspect, each of the components, modules, and/or services described in FIGS. 1-2 may also apply to the components, modules, and services of FIG. 3.

Similar to FIGS. 1-2, the system 300 may include a monitoring service 302 and the compute service 310. The monitoring service 302 can include a dashboard 304. As more clearly depicted in FIG. 3, the dashboard 304 can also include a dashboard widget 306 and a dashboard display 350. The dashboard 304 and the dashboard widget 306 can be in association with and/or in communication with the API 308 within the dashboard 304. Furthermore, the computing instance 320 of FIG. 3 also depicts a container 322 that comprises the program code 324.

In one aspect, the dashboard widget 306 of the dashboard 304 can comprise 1) a rendering widget 355, 2) a graph widget having list of metrics for obtaining data 360, and/or 3) a graph widget for post processing of metric data 365 in the dashboard 304 or monitoring service 302. Each of the dashboard widgets 306 (e.g., data widgets) can call the program code 324. That is, the dashboard widget 306 of the dashboard 304 may display a templated data response as at least one of: a web page in the rendering widget 355, metrics within the monitoring service identified using resource tags obtained by the program code 324 using the second graph widget 360, and labeled data using the third graph widget 365.

In one aspect, the rendering widget 355 can issue to the program code 324 one or more API calls having one or more selected and/or defined optional parameters using the security data template 352. In one aspect, the rendering widget 355 may render any markup language, HyperText Markup Language (HTML), text data, comma-separated values, spreadsheet documents, display style data, read-only data, and/or other display oriented types of languages, such as, for example, cascading style sheets (CSS) and JavaScript. A return value of the one or more API calls may be returned from the program code 324 as a templated data response, which can be HyperText Markup Language (HTML) to be rendered in the area provided for the rendering widget 355 and/or be displayed on the dashboard display 350. In one aspect, the rendering widget 355 may be used to prepare and define one or more API calls from an API 308 using the security data template 352. The parameters in the one or more API calls may be used by the program code 324 to issue further requests to any service in one or more regions or areas of the service provider environment 330. Thus, the rendering widget 355 using the dashboard display 350 can display any information from any source in the service provider environment 330 or a private computing environment. For example, in one aspect, the templated data response may be displayed in the dashboard display 350. In a further example, an alarm status may be depicted from any of a list of regions and displaying of one or more services in the service provider environment 330 in an HTML format may be available (e.g., https://improvement-ninjas.com/sfiles/sget.cgi/alarmStatusWidgetExample.png).

In one aspect, the rendering widget 355 can prepare any API call with the security data template 352 to be sent to the program code 324 to further call any API of a service in a customer's private network. In an additional aspect, the rendering widget 355 may prepare any API call with the security data template 352 to be sent to the program code 324 to further call any API for a service on the public internet which can be external to the service provider environment 330, allowing a templated data response to incorporate information, such as social media (e.g., Twitter feeds), mapping, search engine information, etc., into the templated data response. Accordingly, the rendering widget 355 may display the templated data response as HTML in the dashboard display 350. Simply stated, the rendering widget 355 may send a defined API call to the program code 324 and the program code 324 may further call a service (e.g., a data source or target resource 326) or other functionality from the rendering widget 355 of the dashboard widget 306 via the program code 324. In this configuration, the return information from the rendering widget 355 maybe in HTML, CSV (comma separated values), an spreadsheet document a markup language, or another other similar display language that can be rendered in the dashboard 304 without a significant security risk. In addition, the use of the security data template 352 to allow HTML or other renderable code through to the dashboard may also block code that is a security risk. For example, code such as Java programs, executables, scripts, or macros may be blocked.

In one aspect, the dashboard widget 306 can include the graph widget 360 configured to request a list of metrics for obtaining metric data. The graph widget having a list of metrics for obtaining data 360 may plot a list of metrics obtained from the program code 324 for monitored services in the service provider environment 330. That is, the program code 324 may make a request to a target resource for one or more metric names (e.g., active computing instances) and may return to the graph widget 360 a tagged list of resources or values for the one or more metric names to be graphed. This list of metric names or their associated tags may be obtained in other ways by the program code 324 too. This compute service feature for the graph widget having a list of metrics for obtaining data 360 may enable a customer to dynamically determine a list of metrics to plot. Thus, the graph widget 360 having a list of metrics for obtaining data may issue to the program code 324 one or more API calls having one or more selected and/or defined optional parameters using the security data template 352 to retrieve a templated data response to plot one or more metrics of a list of metrics that react to changing resources of the services in the service provider environment 330. This enables the monitoring service 302 to obtain a listing of metrics tags that is dynamically generated using the program code 324 or using further access to any other target source 326 in order to dynamically determine what listing of metrics may be displayed by the monitoring service 302. Once the listing of metric tags is provided to the monitoring service 302, the monitoring service 302 can retrieve the metrics matching the metric tags from within the monitoring service and display the metrics in the dashboard 304 (e.g., the dashboard display 350). This retrieval of the metrics also assumes that the monitoring services knows the meaning of the metric tags in advance.

For example, assume a customer desires to graph central processing unit (CPU) usage of the customer's running computing instances within the service provider environment 330. However, many times the list of computing instances can change at any given time for each different customer. Thus, this type of dynamic graphing means the customer will need to query to obtain the resource tags or markers for running computing instances prior to graphing in order figure out which hosts will have plotted metrics. To address this challenge, the graph widget 360 may issue a defined API call with requests to collect a list of the resources that are currently desired by the customer to be graphed. The program code 324 which obtains the list of metrics for the graph widget 360 may further call to a service in the service provider environment 330 to determine the list of dynamically running instances. The program code 324 may return to the graph widget 360 a list metric tags as a templated data response that can be a reactive, dynamic list of running instances that may adapt immediately to changing computing instances and/or computing resources in the service provider environment 330. The graph widget 360 having a list of metrics for obtaining data may display the templated data response having the dynamic list of the running instances (e.g., as obtained using a list of metric tags for the list of metric names) on the dashboard display 350. This is in contrast to previously existing functionality contained in a protected monitoring service where the list of metrics displayed for a customer's computing instances was static as defined by the service provider. This technology allows a fully dynamic list of metric tags to be assembled and passed to the monitoring service 302 for displaying of dynamic graphs or dynamic output in the dashboard 304.

In one aspect, the dashboard widget 306 may include the graph widget for post processing of raw metric data 365. In one aspect, the graph widget for post processing of metric data 365 may issue, using the security data template 352, one or more API calls as defined by an API 308 to the program code 324. The program code 324 may further query the data source or target resource 326. In one example, the one or more API calls from the program code 324 may also include one or more functions able to perform customized and/or defined math expressions against the data of the services of the service provider environment 330, or more specifically, the "list of metric", such as "sum", "subtraction", "multiplication", "division", or other types of mathematical equations or functions to execute the mathematical expression upon the data of the service of service provider environment 330, or more specifically, the list of metrics. For example, if the "sum" equation is issued in the one or more API calls 308, the execution of the mathematical equation "sum" can add up all data relating to, for example, list of metrics and can return summed metrics, such as, for example, a label and a listing of data points for the sums.

Accordingly, the graph widget for post processing of metric data 365 can enable customers to utilize the dashboard 304 to plot and manipulate any data, such as, for example, data retrieved from a public internet, social media network, and/or compute instance. Because the program code 324 may execute one or more API calls, such as obtaining data from a service in the service provider environment, obtaining data from a data source or target resource, which may be external to the service provider environment, such as stock data, social media data, from public internet, and/or retrieve data from a private customer API, the program code 324 can enable customers to extend either the graph widget-list of metrics 360 and/or the graph widget for post processing of metric data 365 to dynamically plot data in "real time" (e.g., a time within a specified time constraint and/or a time relating to when data is processed within milliseconds so that the data can be immediately available for feedback).

In summary, as depicted in FIG. 3, the dashboard widget 306 or dashboard 304 may send an API call using the security data template 352 from either 1) the rendering widget 355, 2) the graph widget having list of metrics for obtaining data 360, and/or 3) the graph widget for post processing of metric data 365 to query a data source or target resource 326 for plotting data in the dashboard. Also, a dynamically updated templated data response associated with the API call function may be received according to dynamic data in the data source or target resource 326. Further, the rendering widget 355, the second graph widget 360, and/or the third graph widget 365 may provide dynamic plotting. The templated data response can be based on changing data of the data source or target resource 326 located in one of an internal computing network of the monitoring service for services in the service provider environment 330 and/or an external computing network.

Figure 4:
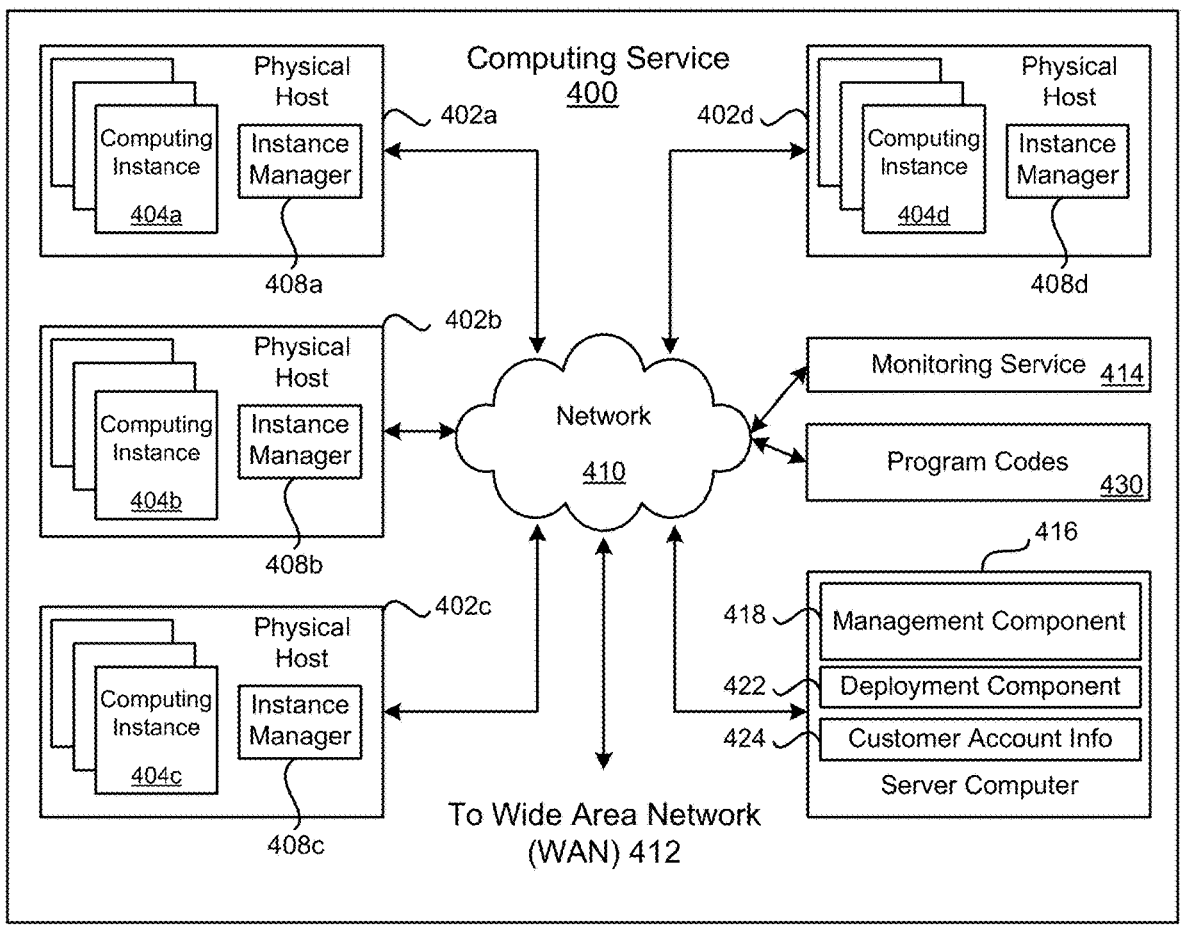
FIG. 4 is a block diagram that illustrates an example computing service environment that includes a receiving service according to an example of the present technology.

FIG. 4 is a block diagram illustrating an example computing service 400 that may be used to execute software services for using a program code with a monitoring service for services functionality in a computing service environment. In particular, the computing service 400 depicted illustrates one environment in which the technology described herein may be used. The computing service 400 may be one type of environment that includes various virtualized service resources that may be used, for instance, to host computing instances 404*a-d* on which a computing service may execute.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Illustratively, the computing service 400 may be described as a "cloud" environment.

The particularly illustrated computing service 400 may include a plurality of server computers 402*a-d*. While four server computers are shown, any number may be used, and large data centers may include thousands of server computers. The computing service 400 may provide computing resources for executing computing instances 404*a-d*. Computing instances 404*a-d* may, for example, be virtual machines. A virtual machine may be an instance of a software implementation of a machine (i.e., a computer) that executes applications like a physical machine. In the example of a virtual machine, each of the server computers 402*a-d* may be configured to execute an instance manager 408*a-d* capable of executing the instances. The instance manager 408*a-d* may be a hypervisor, virtual machine monitor (VMM), or another type of program configured to enable the execution of multiple computing instances 404*a-d* on a single server. Additionally, each of the computing instances 404*a-d* may be configured to execute one or more applications.

Some of the servers may be used for executing a service message request rate management operation service (e.g., service message rate throttling or auto-scaling operation service). For example, a server computer 414 may execute program code a monitoring service for services in a service provider environment according to an example of the present technology. In addition, an additional server 430 or group of servers may execute program codes that may be called from the monitoring service 414.

One or more server computers 416 may be reserved to execute software components for managing the operation of the computing service 400 and the computing instances 404*a-d*. A server computer 416 may execute a management component 418. A customer may access the management component 418 to configure various aspects of the operation of the computing instances 404*a-d* purchased by a customer. For example, the customer may setup computing instances 404*a-d* and make changes to the configuration of the computing instances 404*a-d*.

A deployment component 422 may be used to assist customers in the deployment of computing instances 404*a-d*. The deployment component 422 may have access to account information associated with the computing instances 404*a-d*, such as the name of an owner of the account, credit card information, country of the owner, etc. The deployment component 422 may receive a configuration from a customer that includes data describing how computing instances 404*a-d* may be configured. For example, the configuration may include an operating system, provide one or more applications to be installed in computing instances 404*a-d*, provide scripts and/or other types of code to be executed for configuring computing instances 404*a-d*, provide cache logic specifying how an application cache may be prepared, and other types of information. The deployment component 422 may utilize the customer-provided configuration and cache logic to configure, initialize, and launch computing instances 404*a-d*. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402*a-d*, 416. The network 410 may be a local area network (LAN) and may be connected to a Wide Area Network (WAN) 412 or the Internet, so that end customers may access the computing service 400. The network topology illustrated in FIG. 4 has been simplified; many more networks and networking devices may be utilized to interconnect the various computing systems disclosed herein.

Figure 5C:
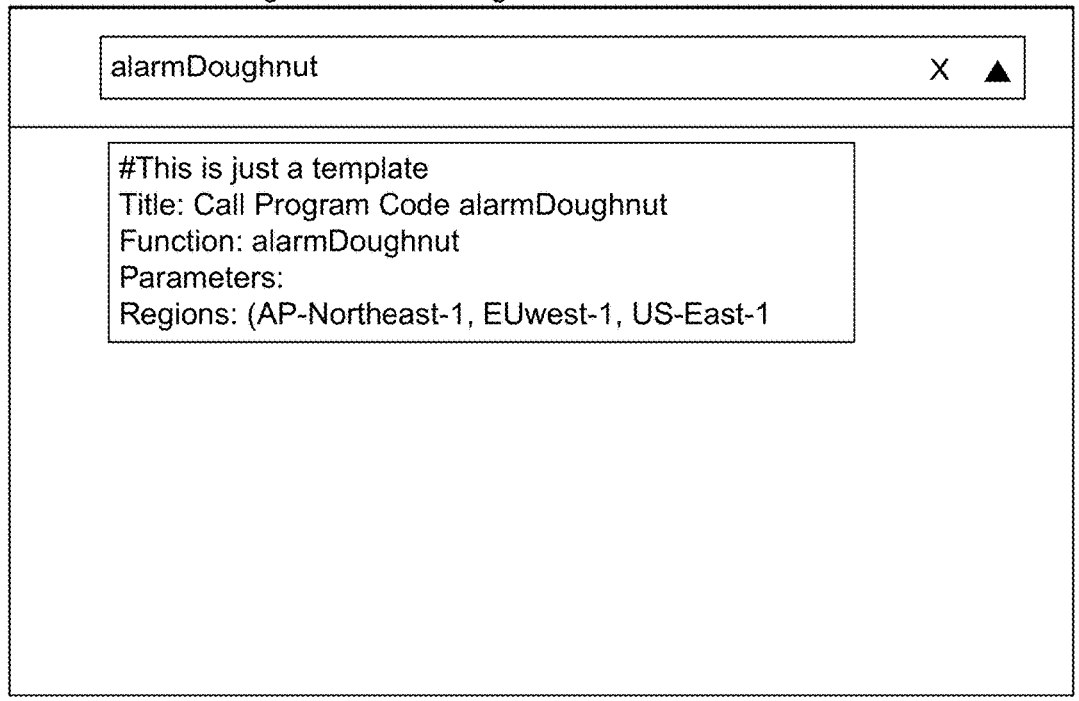
Figure 5C:
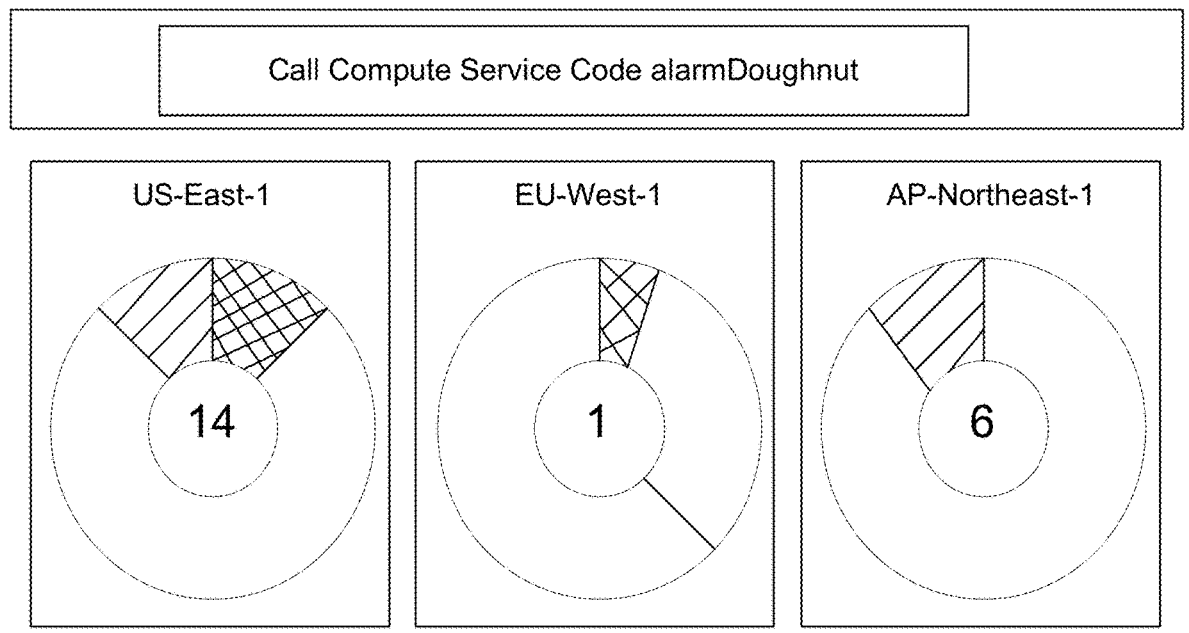

FIGS. 5A-5F illustrate examples of dashboard widgets using a program code with a monitoring service to access services in a service provider environment and other private and public computing resources according to an example of the present technology. FIG. 5A depicts an example dashboard selection display window 500 for selecting and/or adding a widget to a dashboard, such as a dashboard widget. In one aspect, the dashboard selection display window 500 can provide to a customer an interactive display for selecting one or more types of dashboard widgets, such as the HTML widget or rendering widget 355 of FIG. 3.

The dashboard selection display window 525 of FIG. 5B can display a drop down feature to enable a user to select whether to edit and/or create the rendering widget, such as the rendering widget 355 of FIG. 3, using "AlarmDoughnut" as an example. In one aspect, the dashboard widget 550 of FIG. 5C (with the top screen depicting the code and a bottom screen depicting the preview of the widget display), can use the Alarm "doughnut" example and may call the program code using one or more selected regions, such as "US-East-1", "EU-West-1", and/or "AP-Northeast-1", and the program code called may summarize an Alarm status or a monitoring service for additional services in a service provider environment. Those regions with an alarm status may be displayed according to defined protocols, such as displaying first those highest defined priority alarms as compared those alarms having a least defined order of priority or emergency alarm. In one aspect, the input 'parameters" can be the raw parameters sent to the program code function, giving customer control over the output. The parameters for the program code may be predefined and/or the parameters may be any defined parameter as defined or selected by a customer. In one aspect, a user interface in the display area can provide one or more input boxes and dropdown boxes for selecting and/or defining parameters which can be dynamically assembled and used in requesting and/or defining for the program code function what parameters the program code may accept.

In one aspect, the dashboard widget 570 of FIG. 5D (with the top screen depicting the code and the bottom screen depicting the widget display) may depict the program code calling a service or a function of a computing instance service in the service provider environment, such as reboot instances. For example, in one aspect, the dashboard widgets 570 may also provide a "Reboot" feature, such as a button, that can call another program code HTML widget to reboot a computing instance.

Figure 5E:
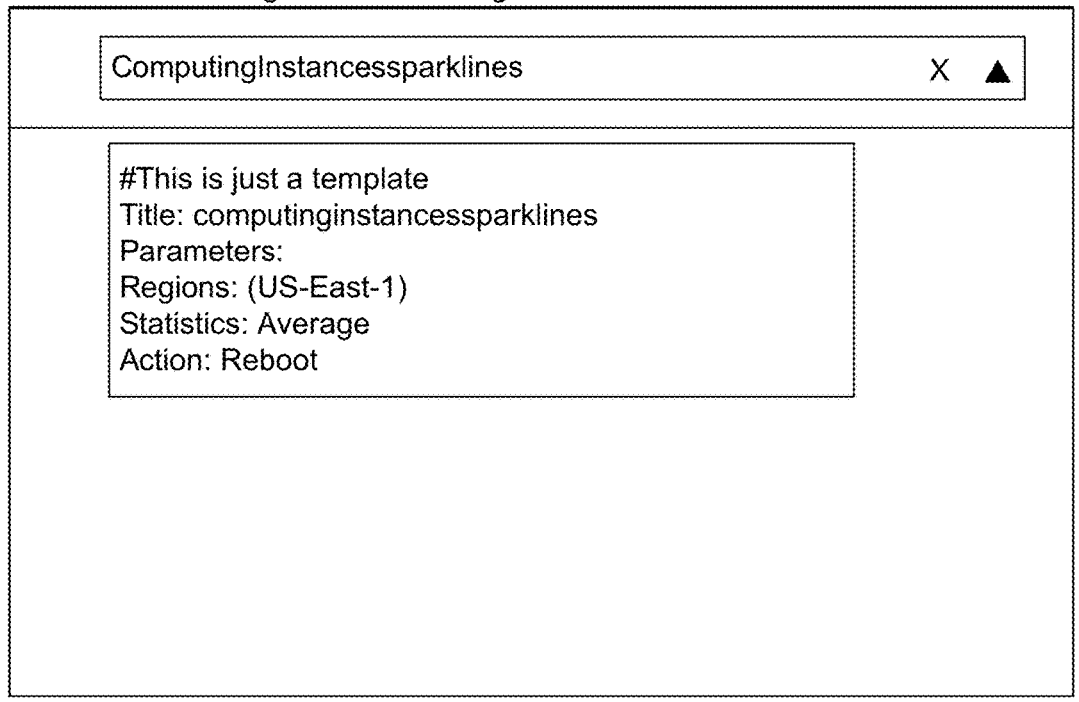
Figure 5E:
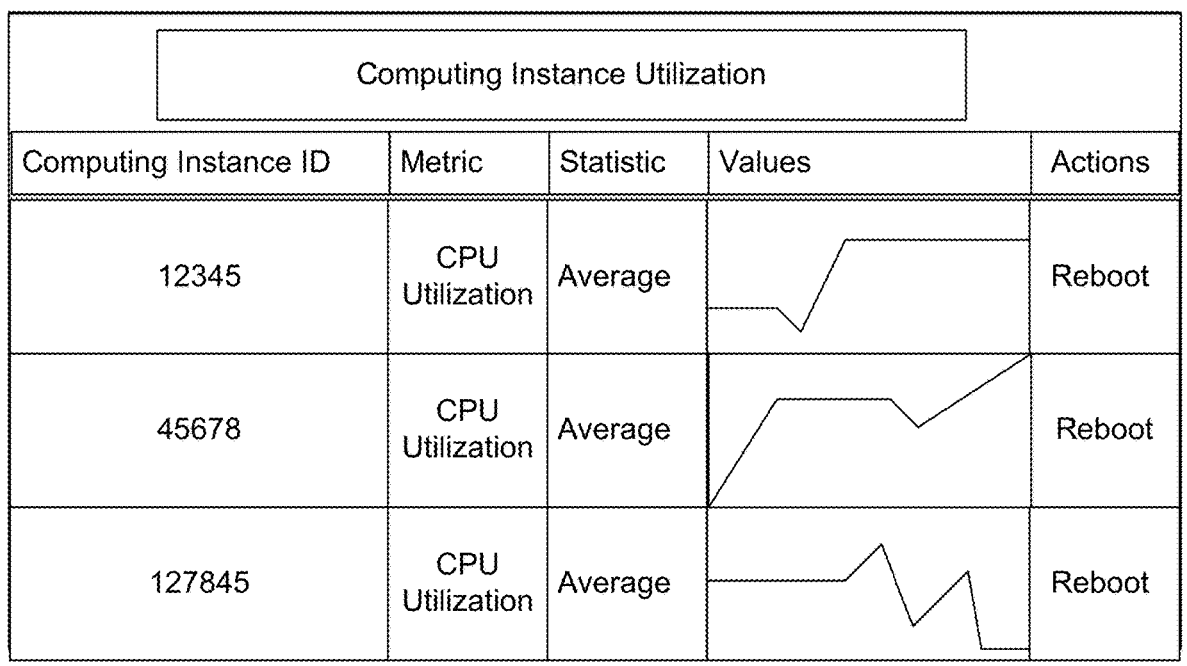

Moreover, the dashboard widgets may also include monitoring a service that may display a latest value of any number of metrics of the monitoring service, such as a display table of computing instances, along with a "sparkline" graph of a recent behavior of the metric, such as in dashboard widget 575 of FIG. 5E. In one aspect, sparklines can be displayed in a table of computing instances along with a sparkline for a selected metric (e.g., CPU Utilization). In one aspect, the computing instances may be displayed and arranged according to customer preference. For example, in one aspect, the dashboard widgets 575 may also provide a "Reboot" feature, such as a button, that can call another program code HTML widget to reboot any computing instance. It should be noted that the HTML returned from a program code HTML widget can include clickable items, such as buttons (e.g., save, configure, actions, and/or other links, which can each individually call the program code HTML widget. In one aspect, one or more additional call functions may be generated from a templated data response. That is, the HTML returned from the program code HTML widget can include clickable items, such as buttons, and issue one or more additional call functions, such as, for example, an API call.

Figure 5F:
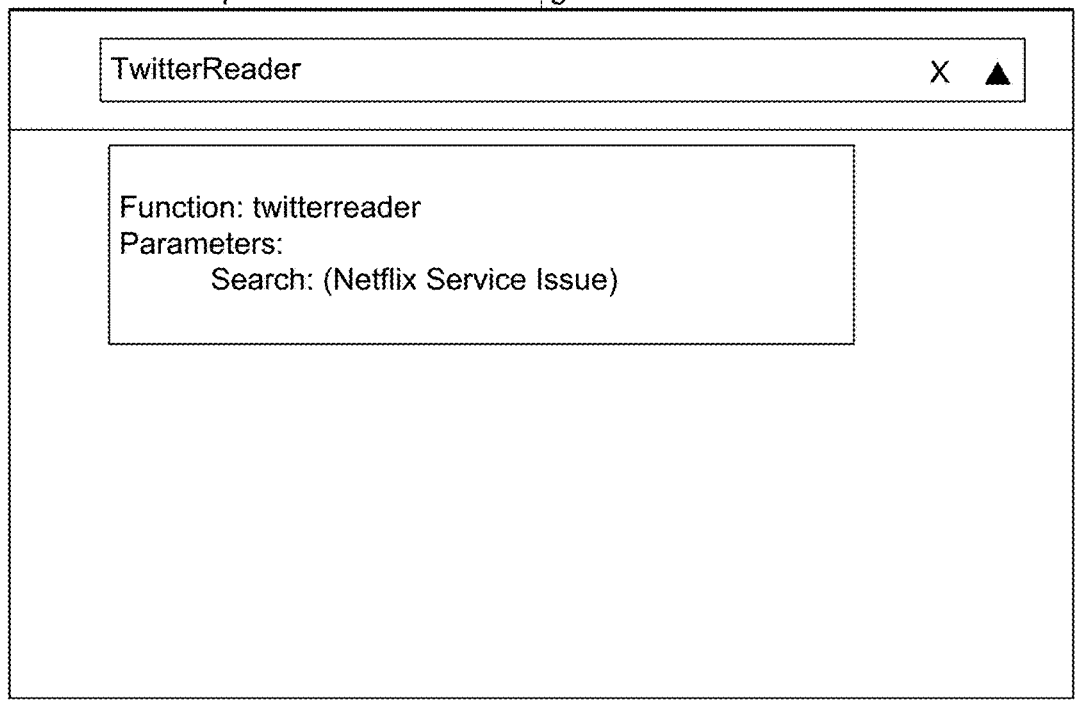
Figure 5F:
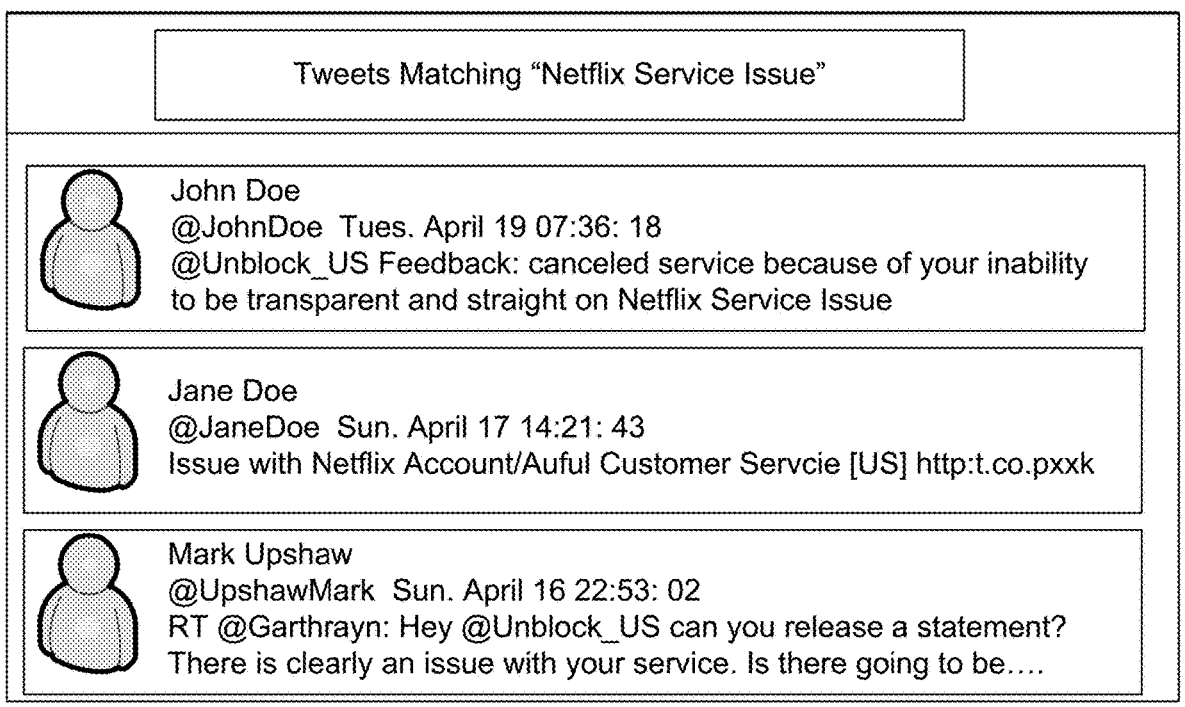

As depicted in the dashboard widget 580 of FIG. 5F, the program code can incorporate social media information into a templated data response and displayed in the dashboard as indicated in the call program code configuration preview of dashboard widget 575. For example, the program code is requesting social media information, such as "tweets" from social media matching a search term (e.g. one that indicates a problem with the customer's website/service, such as Netflix.

Figure 6:
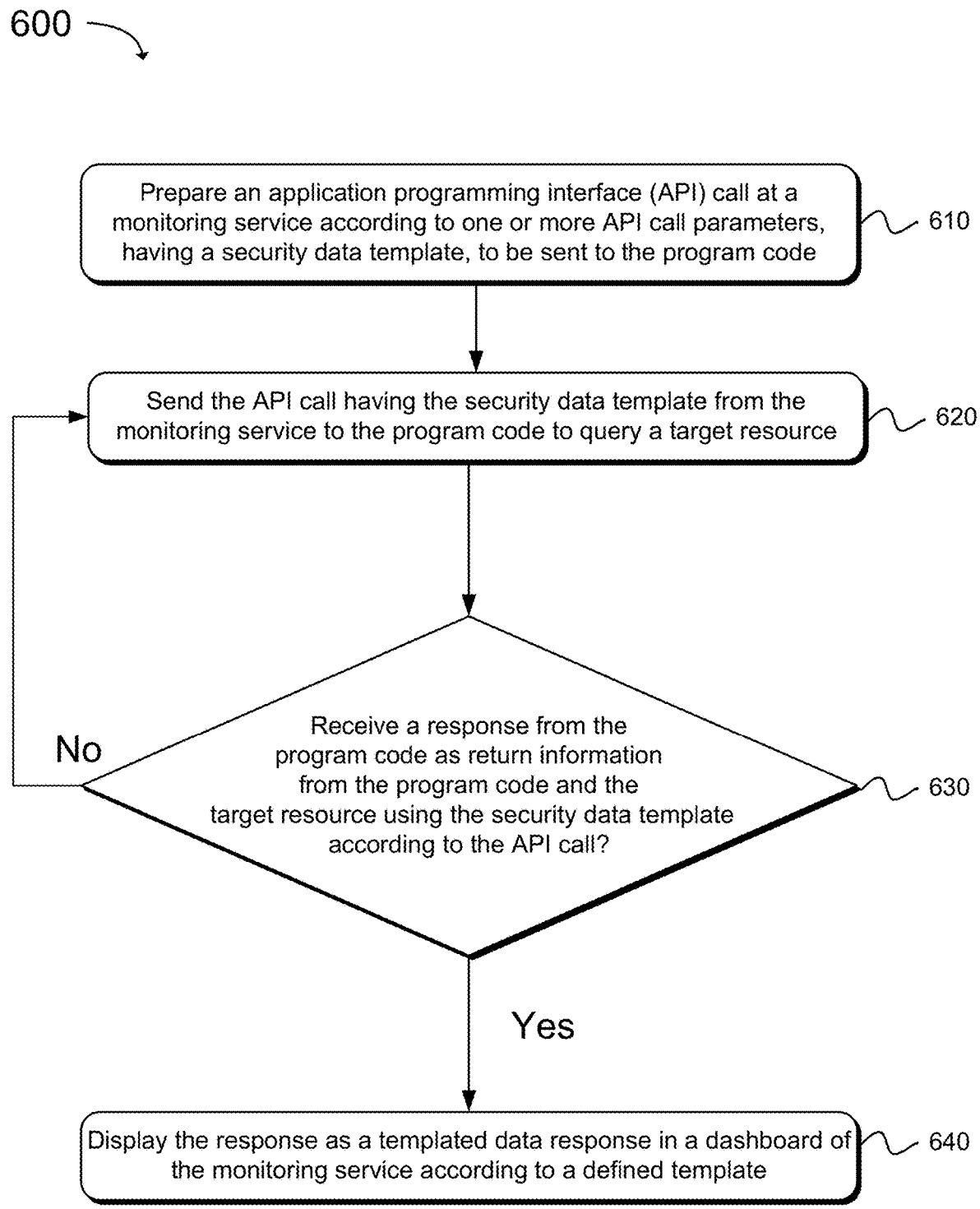
FIG. 6 is a flowchart of an example method for using a program code with a monitoring service for services in a service provider environment according to an example of the present technology.

FIG. 6 is a flowchart of an example method 600 for using a program code with a monitoring service for services in a service provider environment according to an example of the present technology. The functionality 600 may be implemented as a method and executed as instructions on a machine, where the instructions are included on at least one computer readable medium or one non-transitory machine-readable storage medium. For example, starting in block 610, an application programming interface (API) call may be prepared at a monitoring service according to one or more API call parameters, using a security data template, to be sent to the program code. The API call, having the security data template, may be sent from the monitoring service having a dashboard to the program code to query a target resource, as in block 620. An operation is performed to determine whether a response is received from the program code as return information from the program code and the target resource using the security data template according to the API call, as in block 630. If no, the method may return to block 620 and resend the API call having the security data template. If yes, the response may be displayed as a templated data response in the dashboard of the monitoring service according to a defined template, as in block 640. That is, the templated data response may be displayed in a widget of the dashboard.

In one aspect, the executable instructions of method 600 may also display the templated data response in the dashboard as at least one of: a web page, metrics within the monitoring service identified using resource tags, and labeled data. The executable instructions of the method 600 may also send the API call from the monitoring service with the dashboard to the program code using the security data template and the program code can make further requests to the target resource located in an internal computing network of the monitoring service. The API call can also be sent from the monitoring service with the dashboard using the program code using the security data template and the program code makes further requests to the target resource located in an external computing network of the monitoring service. The program code may also define the API call for one or more target resources associated with the monitoring service according to the one or more API call parameters, and/or define the API call for querying the target resource prior to plotting data in the dashboard according to the one or more API call parameters.

Figure 7:
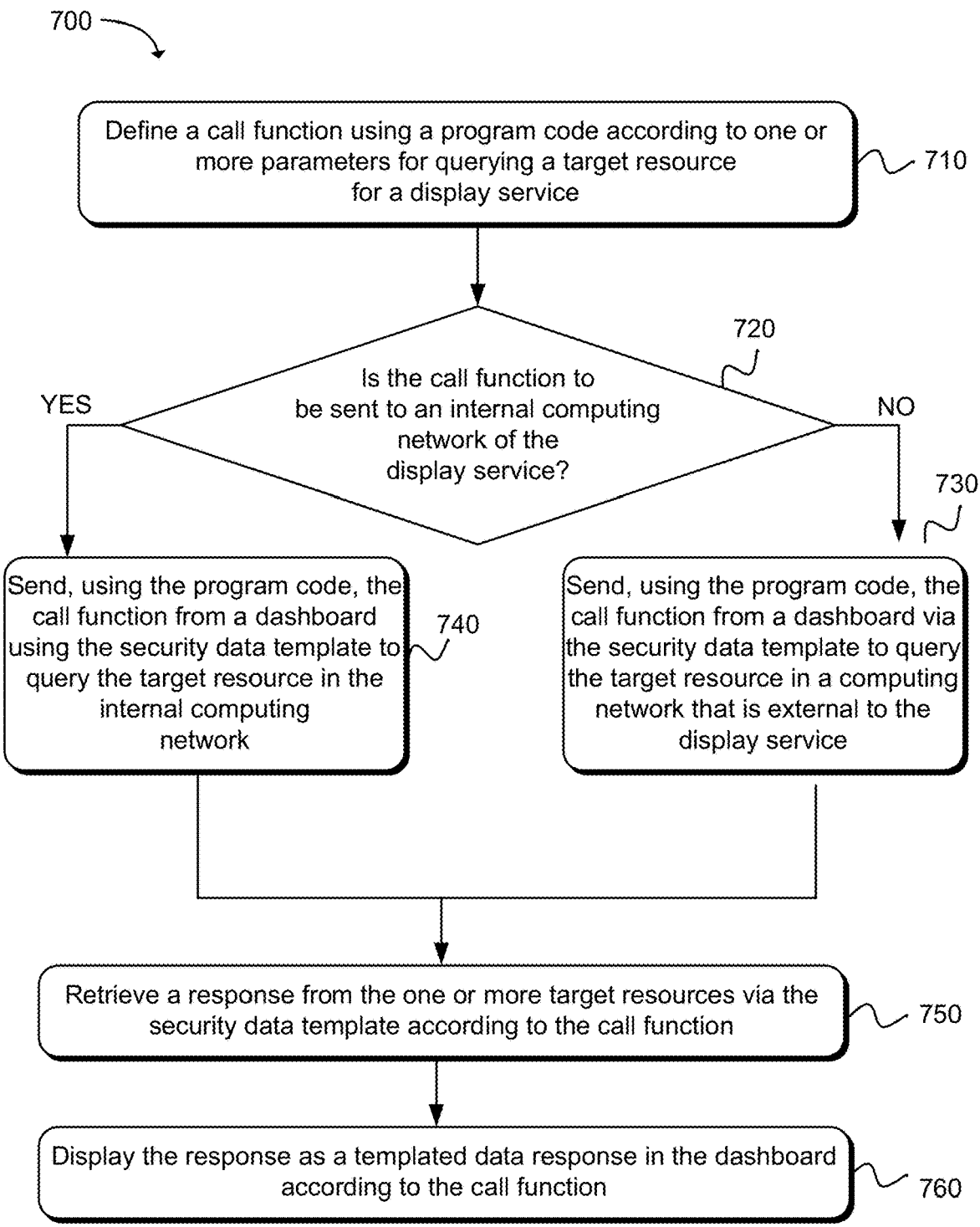
FIG. 7 is a flowchart of an additional example method for using a program code with a monitoring service for services in a service provider environment according to an example of the present technology.

FIG. 7 is a flowchart of an additional example method 700 for using a program code with a display service for services in a service provider environment according to an example of the present technology. In one aspect, the display service may be a service that allows one or more other services to display data within the display service. The functionality 700 may be implemented as a method executed as instructions on a machine, where the instructions are included on at least one computer readable medium or one non-transitory machine-readable storage medium. Starting in block 710, a call function can be defined using a program code according to one or more parameters for querying a target resource for a display service. An operation can be performed to determine if the call function is to be sent to an internal computing network of the display service (or computing network that is external to the display service, such as, for example a social media network), as in block 720. If no, the call function can be sent, using the program code, from a dashboard using the security data template to query the target resource in a computing network that is external to the display service, as in block 730. If yes, then the call function can be sent, using the program code, from a dashboard using the security data template to query the target resource to the internal computing network, as in block 740. A response can be retrieved from the one or more target resources via the security data template according to the call function, as in block 750. The response can be displayed as a templated data response in the dashboard according to the call function, as in block 760.

Figure 8:
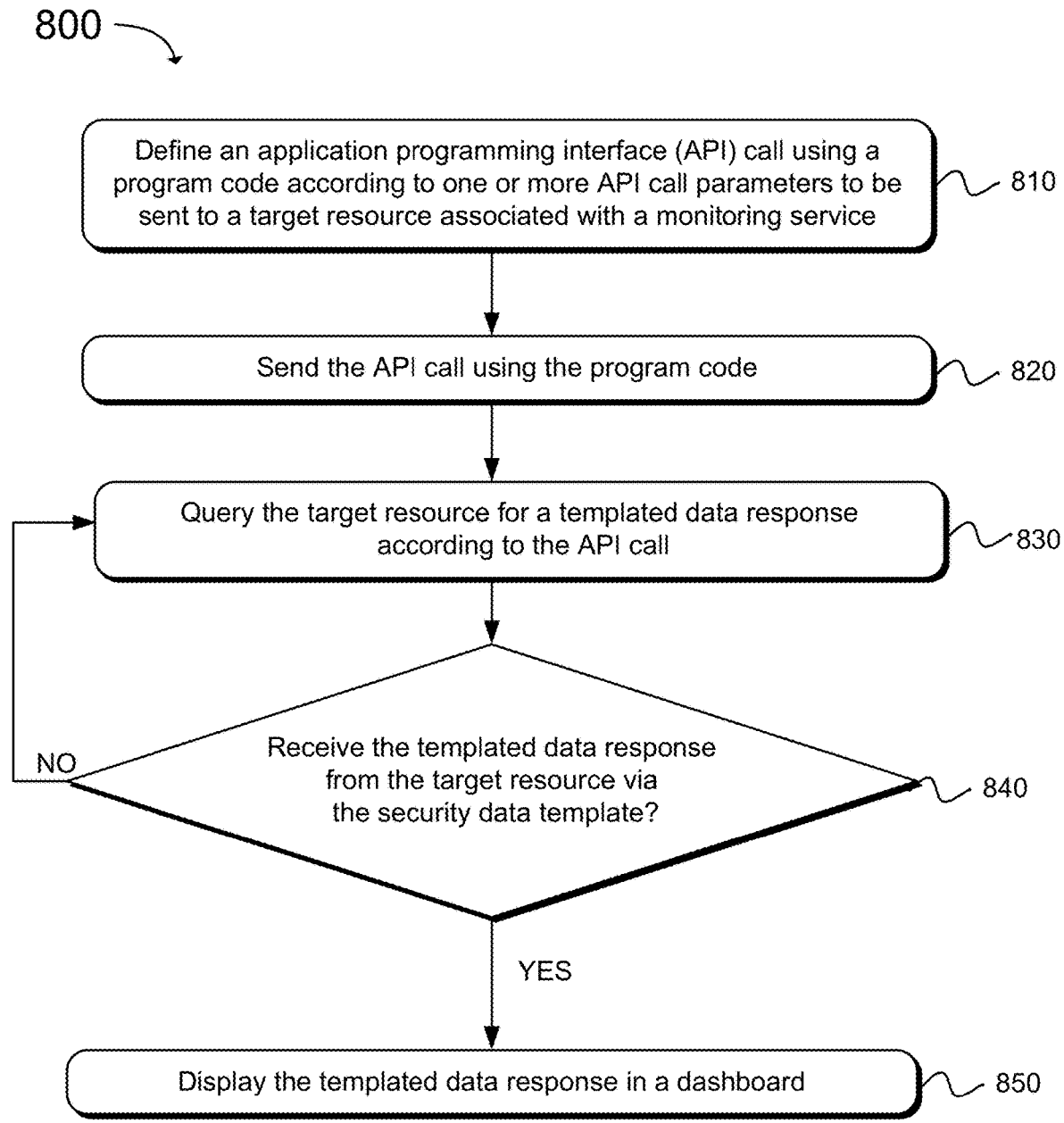
FIG. 8 is a flowchart of an additional example method for using a program code with a monitoring service for services in a service provider environment according to an example of the present technology.

FIG. 8 is a flowchart of an additional example method 800 for using a program code with a monitoring service for services in a service provider environment according to an example of the present technology. The functionality may be implemented as a method executed as instructions on a machine, where the instructions are included on at least one computer readable medium or one non-transitory machine-readable storage medium. Starting in block 810, an application programming interface (API) call can be defined using a program code according to one or more API call parameters to be sent to a target resource associated with a monitoring service. In one aspect, the monitoring service may be a display service. The API call can be sent using the program code, as in block 820. The target resource can be queried for a templated data response according to the API call, as in block 830. An operation can be executed to determine whether the templated data response is retrieved from the target resource via the security data template, as in block 840. If no, the target resource can be re-queried for a templated data response according to the API call, as in block 830. If yes at block 840, the templated data response can be displayed in the dashboard, as in block 850.

In one aspect, in conjunction with and/or as part of at least one block of FIGS. 6-8, the operations of 600, 700, and/or 800 may include each of the following. The operations of 600, 700, and/or 800 may include returning the response from the target resource that includes at least one of a web page, a resource tag, a list of metric data, or labeled data according to the call function. The response may be displayed in the dashboard as one of the web page, data obtained using the resource tag, the list of metric data, and the labeled data according to a defined template associated with the call function. The call function may be sent from the dashboard using the program code and the security data template to the target resource located in an internal computing network of the monitoring service. The call function can be sent from the dashboard using the program code and the security data template and then a portion of the request may be made to the target resource located in an external computing network of the monitoring service.

In one aspect, operations of 600, 700, and/or 800 may include defining, using the program code, the call function according to one or more call function parameters for one or more selected regions of the target resource. In an additional aspect, operations of 600, 700, and/or 800 may include defining, using the program code, the call function according to one or more call function parameters for retrieving a list of metrics identified in the target resource, and/or defining, using the program code, the call function according to one or more call function parameters for querying the target resource for metric data prior to plotting data in the dashboard.

In one aspect, operations of 600, 700, and/or 800 may include sending, using the program code, the call function using the security data template to query the target resource prior to plotting data in the dashboard. An updated templated data response associated with the call function can be received according to changing data of the target resource. An updated templated data response associated with the call function may be received according to changing data of the target resource.

In one aspect, the operations of 600, 700, and/or 800 may include dynamically plotting in one or more widgets of the dashboard the templated data response according to changing data of the target resource located in one of an internal computing network of the monitoring service or an external computing network. Also, social media information may be incorporated into the templated data response in the dashboard.

In one aspect, the service provider environment may include one or more services executing on computing instances, servers or other computer hardware. Such services may be centrally hosted functionality or a service application that may receive requests and provide output to other services or customer devices. For example, modules providing services may be considered on-demand computing that are hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Figure 9:
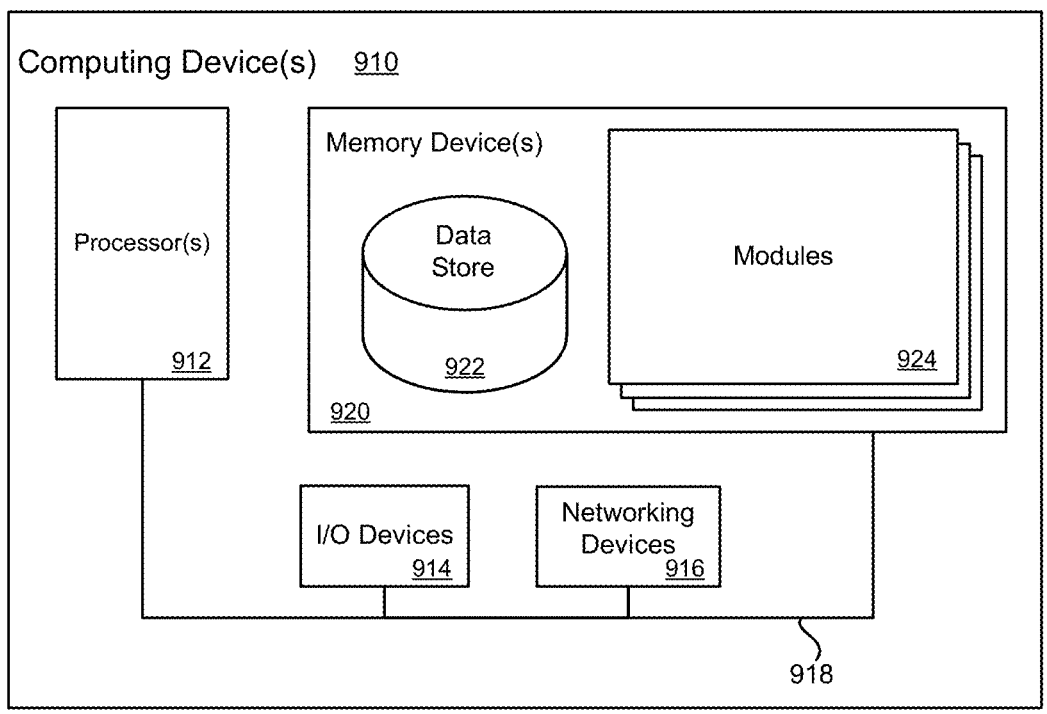
FIG. 9 is a block diagram that provides an example illustration of a computing device that may be employed in the present technology.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device may include a local communication interface 918 for the components in the computing device. For example, the local communication interface may be a local data bus and/or any related address or control busses as may be desired.

The memory device 920 may contain modules 924 that are executable by the processor(s) 912 and data for the modules 924. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. An example of an I/O device is a display screen that is available to display output from the computing devices. Other known I/O device may be used with the computing device as desired. Networking devices 916 and similar communication devices may be included in the computing device. The networking devices 916 may be wired or wireless networking devices that connect to the Internet, a LAN, WAN, or other computing network.

The components or modules that are shown as being stored in the memory device 920 may be executed by the processor 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid-state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method, comprising:
receiving, at a monitoring service collecting metrics associated with resources within a service provider environment, an application programming interface (API) call prepared according to one or more API call parameters associated with a security data template protecting the monitoring service;
sending the API call and the security data template embedded therein from the monitoring service to program code to query a target resource;
receiving, at the monitoring service, a response from the program code and the target resource as return information formatted according to the security data template as a templated data response providing protection for the monitoring service; and
providing a display of the response in the dashboard of the monitoring service, the template data response displaying the response according to a template.

2. The method of claim 1, further comprising providing the display of the templated data response in the dashboard as one of display data, a web page, metrics within the monitoring service identified using resource tags, and labeled data.

3. The method of claim 1, further comprising sending the API call from the monitoring service to the program code with the security data template to instruct the program code to make one or more further requests to the target resource located in a computing network associated with the monitoring service.

4. The method of claim 1, further comprising sending the API call from the monitoring service to the program code with the security data template to instruct the program code to make one or more further requests to the target resource located in a computing network external to the monitoring service.

5. The method of claim 1, further comprising sending the API from the monitoring service to the program code with the security data template to instruct the program code to further define the API call according to one or more API call parameters to be sent to a target resource.

6. A method, comprising:
receiving, at a display service in a service provider environment, a call function defined according to one or more parameters using a security data template for the display service;
sending, to program code, the call function and the security data template as part of the call function from a dashboard of the display service to the program code;
receiving, by the display service, a response from the program code defined by the security data template as a templated data response, wherein the response to the call function includes information about resources in a network; and
providing a display of the response in the dashboard.

7. The method of claim 6, wherein the response includes at least one of a web page, a resource tag, a list of metric data, and labeled data according to the call function.

8. The method of claim 7, further comprising providing the display of the response in the dashboard as one of display data, the web page, data related to the resource tag, the list of metric data in a graph.

9. The method of claim 6, further comprising:
sending the call function as formatted using the security data template from the dashboard to the program code; and
sending a request using the program code to a target resource in a computing network associated with the display service.

10. The method of claim 6, further comprising sending the call function from the dashboard to a target resource in a computing network external to the display service.

11. The method of claim 6, further comprising defining, using the program code, the call function according to one or more call function parameters for one or more selected regions of a target resource.

12. The method of claim 6, further comprising defining, using the program code, the call function according to one or more call function parameters for retrieving a list of metrics associated with a target resource.

13. The method of claim 6, further comprising defining, using the program code, the call function according to one or more call function parameters for querying a target resource for metric data prior to plotting data in the dashboard.

14. The method of claim 13, further comprising sending, using the program code, the call function using the security data template to query a target resource associated prior to plotting data in the dashboard.

15. The method of claim 6, further comprising:
generating one or more additional call functions from the templated data response; or
receiving an updated templated data response associated with the call function according to changing data of a target resource.

16. The method of claim 15, further comprising plotting in one or more widgets of the dashboard graph the templated data response according to changing data of a target resource.

17. The method of claim 6, further comprising incorporating social media information into the templated data response in the dashboard.

18. A non-transitory machine readable storage medium having instructions embodied thereon for using a program code with a monitoring service in a computing service environment, the instructions when executed cause one or more processors and memory to:
receive a first application programming interface (API) call having a security data template as part of the API call at a monitoring service, to be sent to the program code, wherein the monitoring service includes a dashboard;
send the first API call having the security data template as part of the API call from the monitoring service to the program code to enable the program code to;
define a second application programming interface (API) call using the program code according to one or more API call parameters to be sent to a target resource;
send the second API call from the program code to query the target resource; and receive a first response from the target resource at the program code;

receive a second response, from the program code as return information from the program code and the target resource, formatted within the security data template according to the first API call; and provide a display of the templated data response in a dashboard graph.

19. The non-transitory machine readable storage medium of claim 18, wherein the instructions when executed cause the one or more processors and memory to further perform one of:

define, using the program code, the second API call according to the one or more API call parameters for one or more selected regions of a target resource;

define, using the program code, the second API call according to the one or more API call parameters for retrieving a list of metrics associated with the target resource; or define, using the program code, the second API call according to the one or more API call parameters for querying the target resource for metric data prior to plotting data in the dashboard graph.

20. The non-transitory machine readable storage medium of claim 18, wherein the instructions when executed cause the one or more processors and memory to further send the second API call to a target resource located in one of an internal computing network of the monitoring service or an external computing network that is external to the monitoring service.

* * * * *